(No Model.) 2 Sheets—Sheet 1.
E. B. BARKER.
PHOTOGRAPHIC PLATE HOLDER.

No. 520,290. Patented May 22, 1894.

WITNESSES:
Paul Jahut
C. Sedgwick

INVENTOR
E. B. Barker
BY
Munn & Co
ATTORNEYS

THE NATIONAL LITHOGRAPHING COMPANY,
WASHINGTON, D. C.

(No Model.) 2 Sheets—Sheet 2.
E. B. BARKER.
PHOTOGRAPHIC PLATE HOLDER.
No. 520,290. Patented May 22, 1894.
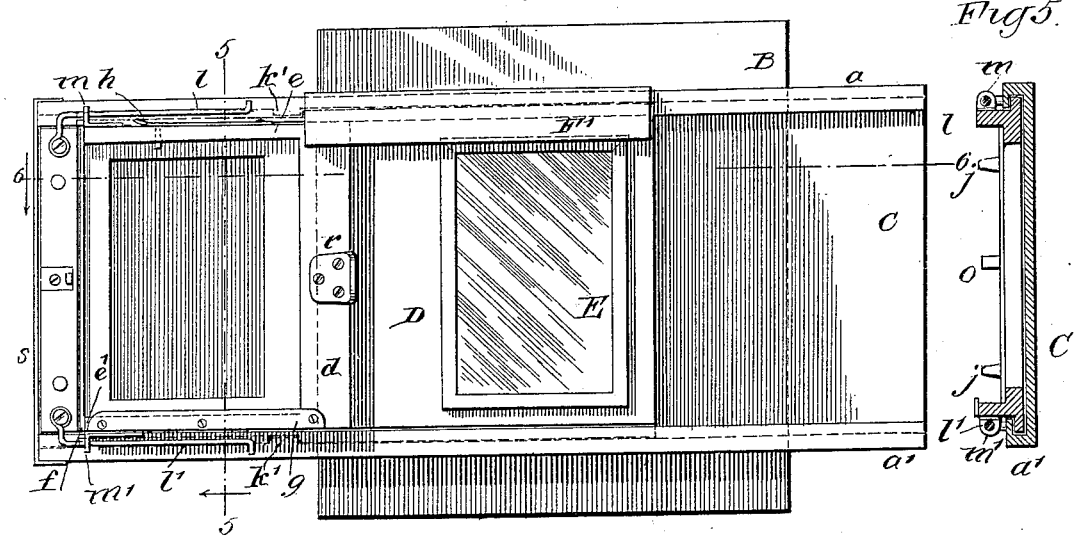
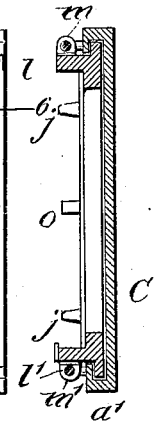
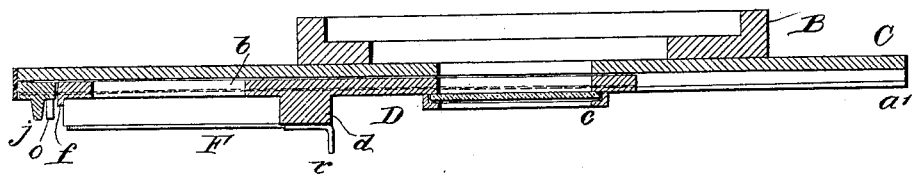
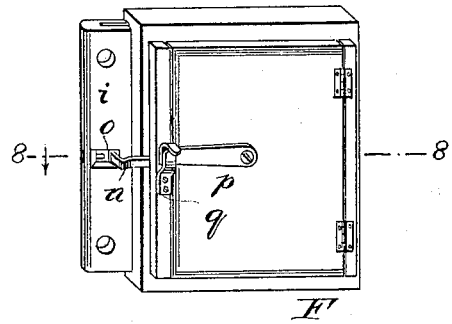
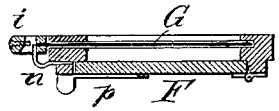
WITNESSES:
Paul Johok
C. Sedgwick
INVENTOR
E. B. Barker
BY Munn & Co
ATTORNEYS
THE NATIONAL LITHOGRAPHING COMPANY,
WASHINGTON, D. C.

UNITED STATES PATENT OFFICE.

ERASTUS B. BARKER, OF NEW YORK, N. Y.

PHOTOGRAPHIC-PLATE HOLDER.

SPECIFICATION forming part of Letters Patent No. 520,290, dated May 22, 1894.

Application filed January 18, 1894. Serial No. 497,293. (No model.)

*To all whom it may concern:*

Be it known that I, ERASTUS B. BARKER, of New York city, in the county and State of New York, have invented a new and Improved Photo-Plate Slide, of which the following is a specification, reference being had to the annexed drawings, forming a part thereof, in which—

Figure 1:
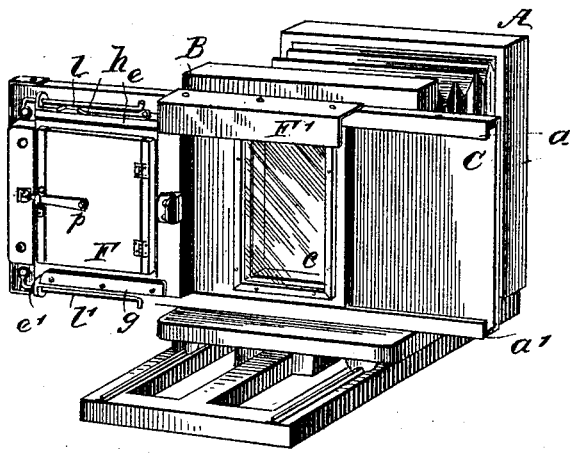
Figure 2:
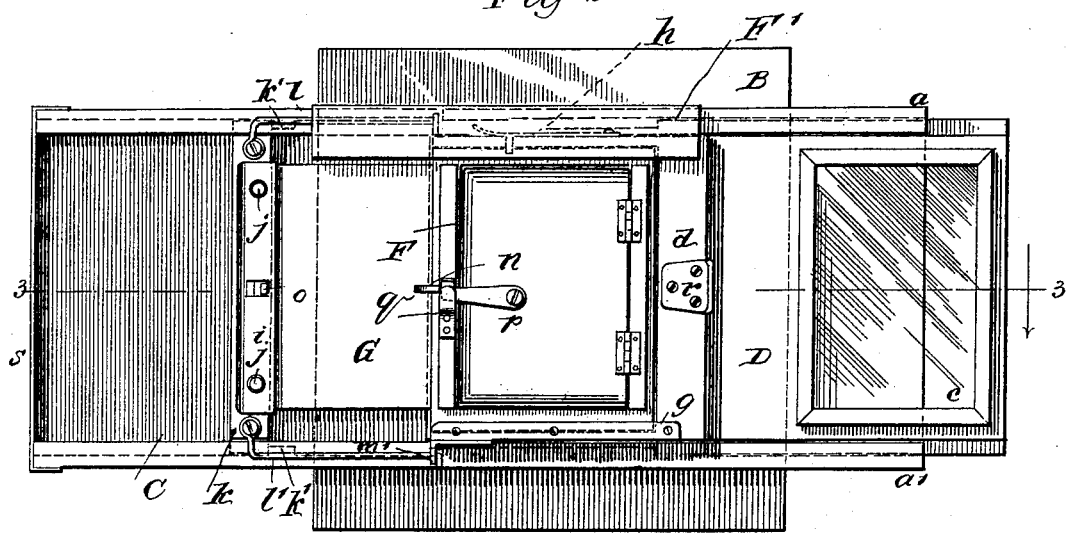
Figure 3:
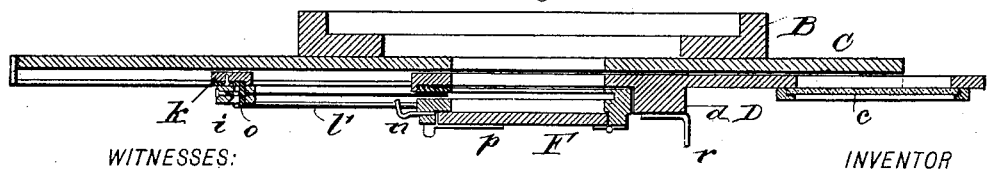

Figure 1 is a perspective view of my improved photo plate slide, showing it attached to a camera in the position of use. Fig. 2 is an enlarged detail rear elevation of the photo plate slide. Fig. 3 is a longitudinal section taken on line 3—3 in Fig. 2. Fig. 4 is a side elevation of the same, with the plate holder removed. Fig. 5 is a transverse section taken on the line 5—5 in Fig. 4. Fig. 6 is a longitudinal section taken on line 6—6 in Fig. 4. Fig. 7 is a perspective view of the plate holder; and Fig. 8 is a transverse section taken on line 8—8 in Fig. 7.

Similar letters of reference indicate corresponding parts in all the views.

The object of my invention is to provide a simple and efficient device by means of which the plate holder may be applied to a camera and the slide withdrawn and replaced, without danger of fogging or accidental exposure.

My invention consists in a camera back secured to the rear end of the camera box and provided with a transverse guide, a slide placed in the guide and provided with a ground glass screen, and means for holding the plate holder and manipulating the dark slide, all as will be hereinafter more fully described.

To the rear end of the camera box A is attached the apertured back board B, to which is secured the guide C, having upon opposite edges grooved guide strips $a\,a'$. To the guide C is fitted a slide D, the edges of which enter into the grooves of the guide strips $a, a'$. The slide D has two apertures $b\,c$. Over the aperture $c$ is placed the ground glass focusing screen E, and over the opening $b$ is placed the plate holder F, a shallow cell being formed around the said opening by strips $d, e, e'$, secured to the slide. The end of the slide D opposite the strip $d$ is provided with a small ledge $f$. The plate holder F is held in its place between the strips $d, e, e'$, by a metal strip $g$ attached to the strip $e'$, and by a catch $h$ attached to the strip $e$, the said catch consisting of a spring carrying a stud which passes through the strip $e$, and enters a hole in the upper end of the plate holder. The dark slide G inserted in the holder F is provided with a bar $i$ at its outer end, having transverse holes near the ends for receiving studs $j\,j'$, which project from a bar $k$ placed in the guide strips $a\,a'$ and connected with the slide D by rods $l\,l'$, attached to the bar $k$ and extending parallel with the slide G, and loosely connected with eyes $m\,m'$ attached to the ends of the strips $e\,e'$, and are bent at their free ends to enable them to serve as stops to the dark slide G. In the grooves of the guide strips $a\,a'$ are secured stops $k'$, which limit the movement of the bar $k$ as it is carried forward by the slide D, in the manner presently to be described. At the center of the bar $i$ is formed an aperture for receiving the end of the spring $n$, which projects from the body of the plate holder F. The said spring serves to fasten the slide G in a closed position when the plate holder is removed from the camera. The center of the bar $k$ is provided with a stud $o$, which the spring $n$ strikes as the plate holder is inserted in the slide D, so that the slide G is released and free to move, as will be described presently.

The plate holder F is of the ordinary form, except the bar $i$ attached to the dark slide, and the spring $n$ for fastening the slide and preventing it from being accidentally withdrawn from the holder. The holder is provided with a hinged door at the back, which is opened when plates are inserted, the said door being furnished with a latch $p$ pivoted to the door and adapted to drop into a catch $q$ secured to the back of the plate holder. To the strip $d$ carried by the slide D is attached an angled plate $r$, of iron, which serves as a handle or finger piece for moving the slide D back and forth in the guide C. To the guide strip $a$ is secured a plate holder retainer F', consisting of an angled plate the free edge of which projects down over the plate holder when it is in position for the exposure of the plate, so that the plate holder cannot be removed from the camera while the dark slide is withdrawn from the plate holder. A plate having been inserted in the plate holder F, the slide G being closed and fastened in the manner described, the lower edge of the plate holder is allowed to rest upon the strip $e'$, being held in position by the metallic strip $g$; the upper part of the plate holder is seated on the slide D and the catch $h$ is allowed to engage the plate holder. In introducing the plate holder into its place in the slide D, the apertured ends of the bar $i$ on the dark slide G are made to receive the studs $j\,j'$, while the central aperture receives the stud $o$. As the plate is pushed forward, the stud $o$ forces the spring $n$ back out of engagement with the bar $i$. The focusing screen E at this time covers the opening in the camera back B. After the focusing is done, the finger piece $r$ is grasped between the thumb and finger and the slide D is moved toward the right hand of the guide C, the movement of the bar $k$ being arrested by engaging the stops $k'$, and the plate holder F is withdrawn from the slide G, which is detained by the engagement of the studs $j\,j'$, $o$, with the bar $i$ in the slide. When the eyes $m\,m'$ reach the forward ends of the rods $l\,l'$, the bar $k$ and the dark slide G are carried along with the plate holder until the opening of the slide D and the plate holder coincide with the opening in the back of the camera. The plate is thus brought into position for exposure, and the dark slide G having been withdrawn from the holder, the exposure is made in the usual way. On returning the plate holder F to its original position, the bar $k$ being held by friction, or arrested by the metallic strip $s$ at the end of the guide C, the plate holder is slid over the dark slide, and when the holder strikes the bar $k$, the bar and the dark slide are carried along with the plate holder to the point of starting. The dark slide being closed, and the plate holder having been removed from beneath the retainer $F'$, the plate holder may be removed after lifting the catch $h$. The operation of removing the plate holder from the slide D withdraws the stud $o$ from the hole in the bar $i$, and allows the spring $n$ to return to its original position, with its free end engaging the bar $i$, as above described. The strip $s$ is bent at right angles at its ends, and pivoted to the edges of the guide C, so that it may be turned out of the way when it is desired to remove the slide D from the guide C.

Having thus described my invention, I claim as new and desire to secure by Letters Patent—

1. A photo plate slide formed of a guide for attachment to a camera box, a slide fitted to the guide, a plate holder furnished with a dark slide locking device and fitted to the slide, and dark slide operating mechanism for drawing the dark slide from the plate holder as the plate holder is carried into position for exposing the plate, and pushing the dark slide into the plate holder as the plate holder is moved in the opposite direction, substantially as specified.

2. In a photo plate slide, the combination of the guide C, the slide D constructed to receive the plate holder F, the plate holder F provided with a dark slide G having the apertured bar $i$, the sliding bar $k$, provided with the stud $o$ and means for connecting the bar $k$ and the slide G, substantially as specified.

3. The combination of the guide C, having stops $k\,k'$, the slide D, the plate holder F fitted to the slide and provided with a dark slide G having apertures in its outer end, and the bar $k$ held by the guide C and provided with studs $j\,j'$ which enter the apertures of the dark slide, substantially as specified.

4. In a photo plate slide, the combination of the plate holder F, the dark slide G having the apertured bar $i$, the spring catch $n$ carried by the body of the plate holder and adapted to enter an aperture in the bar $i$, and a stud $o$ carried by the bar $k$ and adapted to enter the aperture of the bar $i$, for releasing the spring catch $n$, substantially as specified.

5. The combination, with the plate holder F, provided with eyes $m\,m'$, and the dark slide operating bar $k$, of rods $l\,l'$ attached to the bar $k$ and passing loosely through the eyes $m\,m'$, substantially as specified.

6. In a photo plate slide, the combination, with the guide C and plate-holder-receiving slide D, of the metallic strip $s$ pivoted to the guide C, for preventing the accidental removal of the slide D from the guide C, as specified.

7. In a photo plate slide, the combination, with the guide C and plate holder F, of a plate holder retainer $F'$, for preventing the removal of the plate holder from the photo plate slide while the dark slide is withdrawn, substantially as specified.

ERASTUS B. BARKER.

Witnesses:
JNO. M. RITTER,
F. W. HANAFORD.